US010115316B2

(12) United States Patent
Barkan et al.

(10) Patent No.: US 10,115,316 B2
(45) Date of Patent: Oct. 30, 2018

(54) QUESTION GENERATOR BASED ON ELEMENTS OF AN EXISTING QUESTION (71) Applicant: International Business Machines Corporation, Armonk, NY (US)

(72) Inventors: Ella Barkan, Haifa (IL); Sharbell Hashoul, Haifa (IL); Andre Heilper, Haifa (IL); Pavel Kisilev, Maalot (IL); Asaf Tzadok, Nesher (IL); Eugene Walach, Haifa (IL)

(73) Assignee: International Business Machines Corporation, Armonk, NY (US)

(*) Notice: Subject to any disclaimer, the term of this patent is extended or adjusted under 35 U.S.C. 154(b) by 701 days.

(21) Appl. No.: 14/335,952

(22) Filed: Jul. 21, 2014

(65) Prior Publication Data
US 2016/0019812 A1 Jan. 21, 2016

(51) Int. Cl.
*G09B 7/00* (2006.01)
(52) U.S. Cl.
CPC ..................... *G09B 7/00* (2013.01)
(58) Field of Classification Search
CPC ......................................................... G09B 7/00
See application file for complete search history.

(56) References Cited

U.S. PATENT DOCUMENTS

| 8,437,963 | B2 | 5/2013 | Onell et al. | |
|---|---|---|---|---|
| 9,082,309 | B1* | 7/2015 | Fuka | G09B 7/00 |
| 2004/0030556 | A1* | 2/2004 | Bennett | G06F 17/27 704/270 |
| 2004/0117189 | A1* | 6/2004 | Bennett | G06F 17/27 704/270.1 |
| 2005/0181346 | A1* | 8/2005 | Heller | G09B 7/00 434/322 |
| 2012/0196261 | A1* | 8/2012 | Kim | G09B 7/02 434/322 |
| 2012/0288844 | A1* | 11/2012 | Anand | G09B 7/08 434/353 |
| 2013/0066643 | A1* | 3/2013 | Seward | G06Q 50/22 705/2 |
| 2013/0089248 | A1* | 4/2013 | Remiszewski | G06K 9/00127 382/128 |

(Continued)

OTHER PUBLICATIONS

Cao et al. AskHERMES: An online question answering system for complex clinical questions. Journal of Biomedical Informatics 44 (2011) 277-288. (Year: 2011).*

(Continued)

*Primary Examiner* — Robert A Cassity
*Assistant Examiner* — Robert Bejcek, II
(74) *Attorney, Agent, or Firm* — Ziv Glazberg (57) ABSTRACT

A computer implemented method, a computerized system and a computer program product for generating questions. The computer implemented method comprising obtaining a question, wherein the question comprises one or more elements that define an answer for the question. The method further comprising obtaining the answer. The method further comprises automatically generating, by a processor, a new question based on the question and the answer. The automatic generation comprises determining a variant of the one or more elements, wherein the variant defines the answer, wherein the new question comprises the variant.

19 Claims, 3 Drawing Sheets

(56) References Cited

U.S. PATENT DOCUMENTS

| | | | | |
|---|---|---|---|---|
| 2013/0110550 A1* | 5/2013 | Upadhyayula | ........ | G06F 19/345 |
| | | | | 705/3 |
| 2016/0163215 A1* | 6/2016 | Anand | ..................... | G09B 7/02 |
| | | | | 434/353 |
| 2016/0378919 A1* | 12/2016 | McNutt | ................. | G06F 19/322 |
| | | | | 705/3 |

OTHER PUBLICATIONS

Judge et al. QuestionBank: Creating a Corpus of Parse-Annotated Questions. Proceedings of the 21st International Conference on Computational Linguistics and 44th Annual Meeting of the ACL, pp. 497-504, Sydney, Jul. 2006. (Year: 2006).*

Lee et al., "Automating Test case Generation for Computer Interpretable Clinical Guidelines", 23rd International Conference of the European Federation for Medical Informatics, 2011.

Lamy et al., "Testing Methods for Decision Support Systems", Decision Support Systems, pp. 87-99, Jan. 2010.

Lamy et al., "Use of the C4.5 Machine Learning Algorithm to Test a Clinical Guideline-Based Decision Support System", MIE, vol. 136 of Studies in Health Technology and Informatics, pp. 223-228, 2008.

Yoo et al., "Evaluation Factors of Clinical Decision Support System", World Academy of Science, Engineering and Technology, International Journal of Medical, Pharmaceutical Science and Engineering vol. 7, No. 10, 2013.

Wagholikar et al., "Formative Evaluation of the Accuracy of a Clinical Decision Support System for Cervical Cancer Screening", Journal of the American Medical Informatics Association, vol. 20, Issue 4, pp. 749-757' Jul. 2013.

Martins et al., "Offline testing of the athena hypertension decision support system knowledge base to improve the accuracy of recommendations", AMIA 2006 Symposium Proceedings, pp. 539-543.

* cited by examiner

QUESTION GENERATOR BASED ON ELEMENTS OF AN EXISTING QUESTION

TECHNICAL FIELD

The present disclosure relates to test generation in general, and to generation of new questions based on existing questions, in particular.

BACKGROUND

Given continuous increases in the costs of healthcare systems, automated clinical decision support is likely to become a crucial feature of any modern healthcare solution. However, in order for such automated support system to exist, one may require a corpus of tests. The corpus may be used for testing the suggestions or decisions proposed by the automated system. Additionally or alternatively, the corpus may be used for training the system, in accordance with machine learning techniques.

Today, the corpus of tests may be manually designed by highly trained individuals. In order to devise a meaningful corpus, experts may invest large amounts of time to manually define the tests and indicate the correct answer for each test. Such a substantial investment may require large amounts of resources in order to develop such a system.

It will be noted, however, that though particularly relevant to clinical decision support system, the same challenge may also apply for the other automated systems, such as non-clinical decision support systems, machine learning systems, or the like.

BRIEF SUMMARY

One exemplary embodiment of the disclosed subject matter is a computer-implemented method comprising: obtaining a question, wherein the question comprises one or more elements that define an answer for the question; obtaining the answer; automatically generating, by a processor, a new question based on the question and the answer, wherein said generating comprises: determining a variant of the one or more elements, wherein the variant defines the answer, wherein the new question comprises the variant.

Another exemplary embodiment of the disclosed subject matter is a computerized apparatus having a processor, the processor being adapted to perform the steps of: obtaining a question, wherein the question comprises one or more elements that define an answer for the question; obtaining the answer; automatically generating a new question based on the question and the answer, wherein said generating comprises: determining a variant of the one or more elements, wherein the variant defines the answer, wherein the new question comprises the variant.

Yet another exemplary embodiment of the disclosed subject matter is a computer program product comprising a computer readable storage medium retaining program instructions, which program instructions when read by a processor, cause the processor to perform a method comprising: obtaining a question, wherein the question comprises one or more elements that define an answer for the question; obtaining the answer; automatically generating a new question based on the question and the answer, wherein said generating comprises: determining a variant of the one or more elements, wherein the variant defines the answer, wherein the new question comprises the variant.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to generate questions to be provided to a system, which is configured to automatically solve such questions. In some exemplary embodiments, the questions may be generated automatically. In some cases, the generation may be performed without using human experts.

In some exemplary embodiments, the question may be a clinical question about a subject. In some cases, the answer to the question may be a clinical diagnosis of the subject, a patient management recommendation regarding the subject, or the like. In some cases, the question may comprise clinical information about the subject, which may be provided in textual format. The clinical information may be, for example, demographic information, symptoms, disease history, treatment history and the like. The clinical information may be textual information regarding the subject which may support the answer (e.g., clinical diagnosis, patient management recommendation or the like).

In some exemplary embodiments, the question may be a multiple choice question. The question may comprise multiple choices including the answer and one or more alternative answers. In case the question is a clinical question, the alternative answers may be wrong clinical diagnosis of the subject in view of clinical information and/or other elements of the question.

In some exemplary embodiments, the question may include an image of the subject. In case of a clinical question, the image may be a diagnostic image. The image may be characterized by one or more clinical features that may support the clinical diagnosis of the subject. In some cases, the question may include more than one image. The one or more images may or may not be related to each other.

In some exemplary embodiments, several questions may be connected to each other. As an example, the several questions may be clinical questions about a same subject. The answer to one question, such as for example a diagnosis of a condition attributed to the subject, may be a clinical information about the subject in another question of the several questions.

In some exemplary embodiments, the system to which the questions are provided may be a Decision Support System (DSS) to be used to assist human experts and/or to replace such experts. Additionally or alternatively, the system may implement a machine learning technique, such as but not limited to Support Vector Machine (SVM), a decision tree, k-means clustering, or the like.

One technical solution is to generate one or more new questions based on an existing question and the answer thereto. The question may be generated by determining a variant of one or more elements the question comprises. The variant may be different than the element of the question without changing the answer to the question. The new question that is generated may comprise the variant. The answer may be a correct answer to the new question as well.

The existing question may be taken from exams administered to human participants. In some exemplary embodiments, when the system is configured to answer clinical questions such as to assist doctors or replace them, the existing questions may be taken from medical exams, such as medical licensing examinations. Such exams may be designed to test a wide variety of practical cases and therefore may be useful as a basis of the questions corpus.

In some exemplary embodiments, textual portions of the question may be translated into semantic representation which may or may not be based on a predefined ontology of terms. This translation can be done manually or using an automated Natural Language Processing (NLP) engine.

An initial corpus of questions, such as manually drafted for exams, may be enriched by variants using the disclosed subject matter to provide a significantly larger corpus. As an example, consider one question that comprises three separate elements. In case the first element has five possible variants, the second element has six variants, and the third element has ten variants, the disclosed subject matter may generate a total of three hundred new questions based on a single question, thereby increasing the corpus by two orders of magnitude.

In some exemplary embodiments, a set of groups of valuations of an element may be a priori created or obtained. Each group of valuations may comprise alternative values of the element which do not change the answer. In some exemplary embodiments, each element may have a different set of groups of valuations associated with the element for different answers. As an example, for an element indicating an age of the subject, a first group of valuations may be ages 0-20, a second group of valuations may be ages 21-40, and a third group of valuations may be ages 41-100. As another example, the above-mentioned set of groups may be applicable to an answer that indicates diagnosis of a breast cancer, while a different partitioning may be applicable for other diagnoses.

In some exemplary embodiments, an element of a question may be represented by an independent variable. As an example, textual clinical information describing an age of the subject, demographic information about the subject and symptoms of the subject may be represented by three independent variables: an age variable, a demographic information variable and a symptoms variable. In such cases, the set of groups of valuations of the element may comprise alternative values of each of the independent variables representing the element, which do not change the answer. As in the above example, a first set of groups of valuations may be ages 0-20 (age variable), any demographic information (demographic information variable) and bruising in skin or redness in the skin (symptoms variable). A second group of valuations may be ages 21-40 (age variable), pregnant or breast feeding (demographic information variable), and suffering from skin redness (symptoms variable). The definition of the set of groups may be performed manually by physicians or automatically based on a clinical diagnostic database.

In some exemplary embodiments, when the exiting question is a clinical question that comprises an image, clinical features may be used to characterize the image. A variant of the image may be an image having the same clinical features. In some exemplary embodiments, a database of images may be processed to define the clinical features of each image thereby providing a set of variants for the image of the existing question.

New questions may be generated using all or some of the possible combinations variants of the elements of the question. As an example, consider a clinical question with an image, where the clinical information is represented by three independent variables. Assuming that each independent variable has four alternative values that do not change the answer, and assuming there are ten variants for the image (e.g., 10 images that have the same clinical features as the image), 640 new questions may be generated using the different $4^3*10$ variants of the existing question, and thereby, increasing the existing corpus of questions with 640 questions.

In some exemplary embodiments, the new generated questions may be used to test the system, by using the system to provide a proposed answer to the new question and comparing the proposed answer with the answer. Additionally or alternatively, in cases that the system implements machine learning, the new generated question and its answer may be part of a training dataset that may be used to train the system.

One technical effect of utilizing the disclosed subject matter may be increasing an existing corpus of questions by an order of magnitude. The disclosed subject matter may increase the number of questions while reducing the need of human assistance or at least the assistance of experts. Using questions that were devised to test humans may provide an initial corpus that is not tailored for the system and that makes use of existing work products. Such questions may also cover a wide variety of questions that are relevant for a DSS or similar system.

Another technical effect may be improving the testing of the system by providing a larger test suite for the system. The larger test suite may cover a wider variety of cases during the testing phase. By providing a large test suite one could also calculate a relatively reliable success probability of the system in answering questions.

Yet another technical effect may be improving the training of the system, by providing the system with a larger training dataset. The obtained training dataset may cover a wide variety of cases to be used for training the system. The training dataset that is based on questions that are administered to human experts may be used to train the system to answer questions similarly to the experts.

Figure 1:
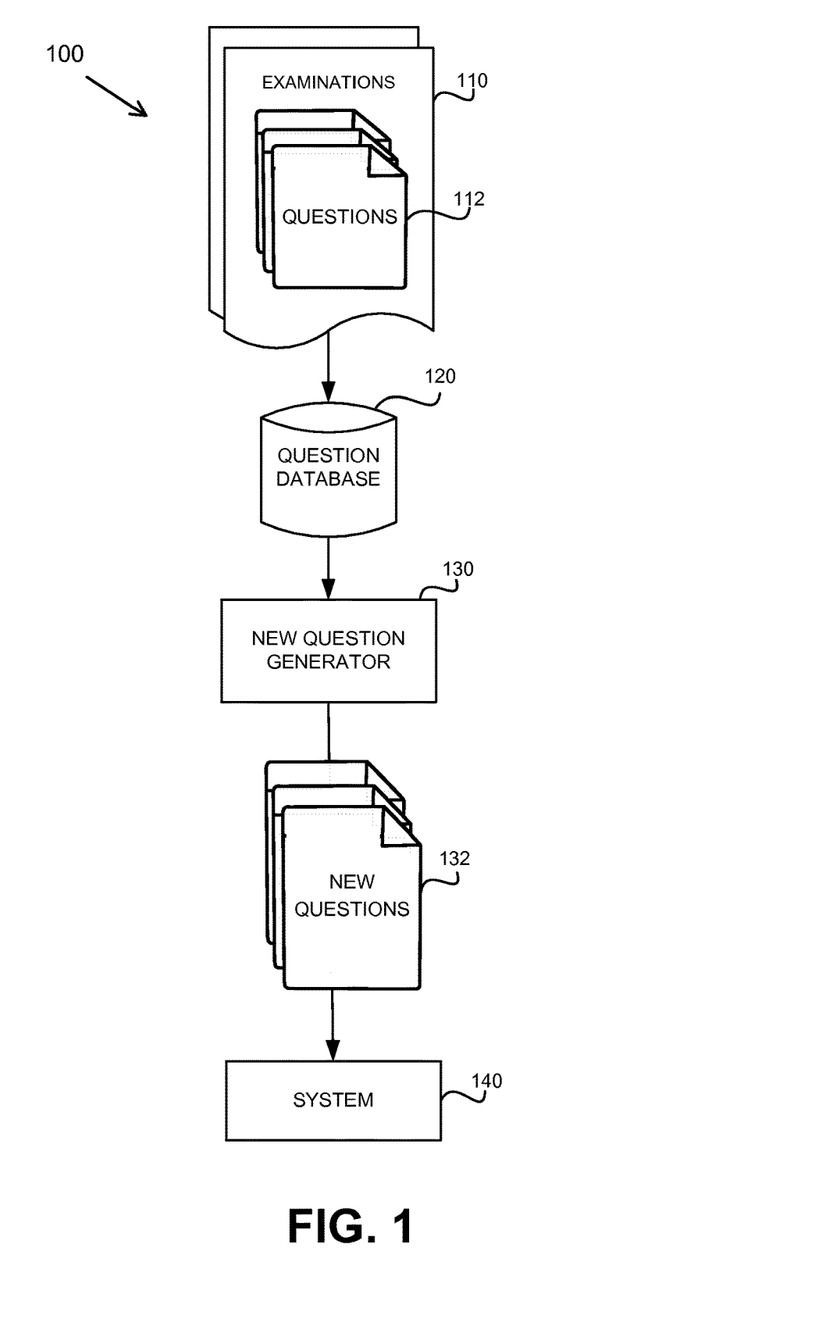
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

A Computerized Environment 100 may comprise a Question Database 120 containing an initial corpus of questions. The questions may be Questions 112 that are extracted from Examinations 110 administrated to human participants. In some exemplary embodiments, Examinations 110 may be professional examinations administered to physicians, doctors, lawyers, engineers, or the like. Additionally or alternatively, Examinations 110 may be exams that test professional competency of the participant and which may be required in order to receive a qualification, such as bar examination. It will be noted that a single examination may contain several questions. In some exemplary embodiments, Questions 112 may be converted from a hard copy to a digital copy and then may be stored in Question Database 120. Questions 112 may be accompanied with their correct answers. Question Database 120 may additionally store the answers of each retained question.

A New Question Generator 130 may be configured to generate one or more New Questions 132 based on an existing question and the answer thereto. The existing question and answer thereto may be obtained from Question Database 120. The existing questions may comprise one or more elements that define the answer. New Question Generator 130 may generate a new question by determining a variant of one or more elements of the existing question that does not change the answer. The new question may comprise the variant instead of the element that the variant corresponds to.

Computerized Environment 110 may also comprise a System 140. System 140 may be configured to automatically solve questions similar to Questions 112, to New Questions 132, or the like. In some exemplary embodiments, System 140 may be a decision support system. New Questions 132 may be provided to System 140. System 140 may be tested using New Questions 132 by comparing the proposed answer provided by System 140 to each question with the answer of that question. Additionally or alternatively, System 140 may implement machine learning. In such cases, New Questions 132 and the answers thereto may be used to train System 140.

In some exemplary embodiments, System 140 may use existing questions from Question Database 120 to implement operations described above with respect to New Questions 132, such as testing and training.

Figure 2:
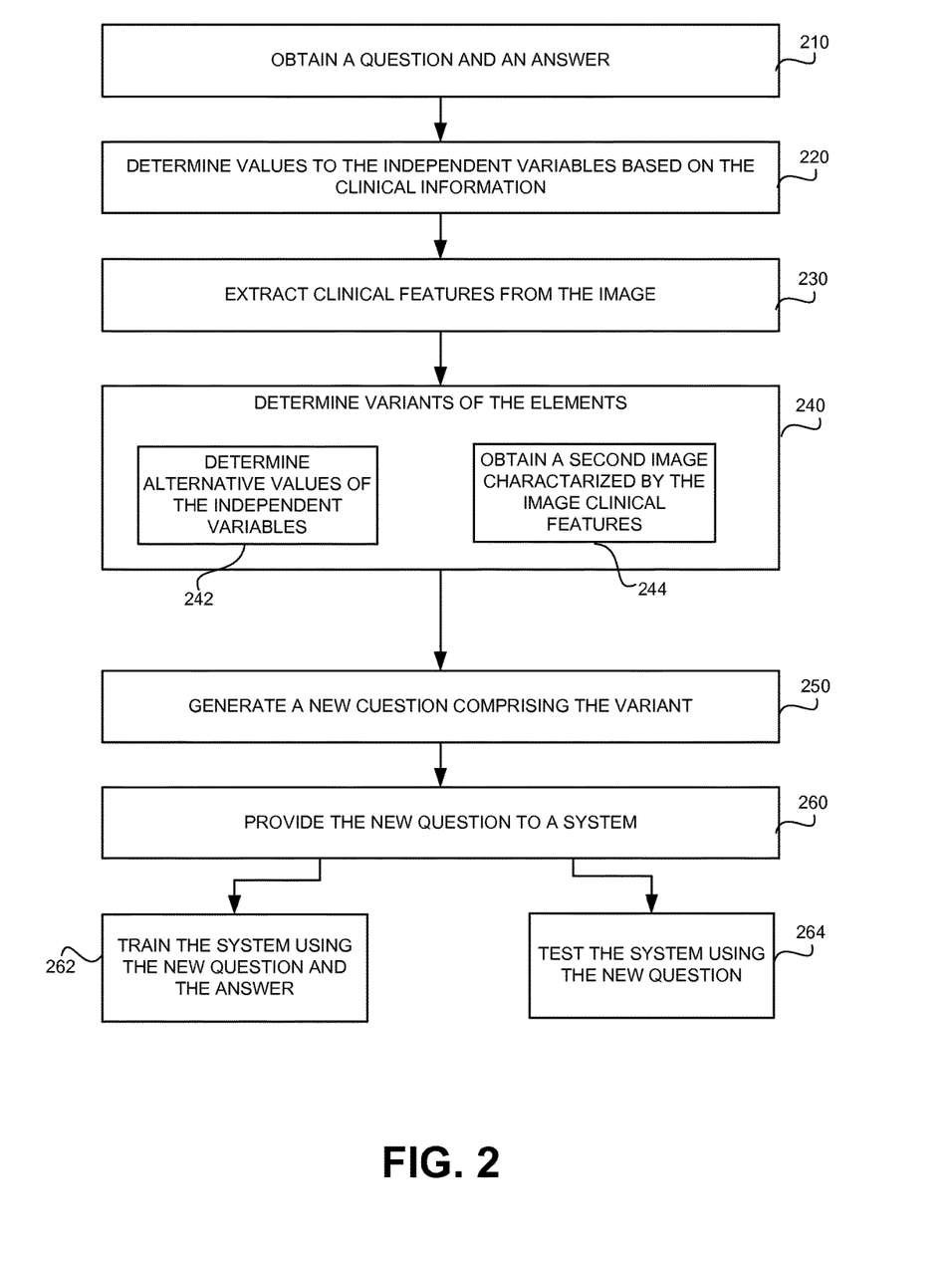
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In Step 210, a question and an answer may be obtained. The question may comprise one or more elements that define the answer to the question. The question and the answer may be obtained from an initial corpus of questions, such as, for example, retained in Questions Database 120 of FIG. 1. In some exemplary embodiments, the question may be a clinical question about a subject, and the answer may be a clinical diagnosis of the subject that is in accordance with the information presented in the question. In some exemplary embodiments, one element of the question may be textual information describing clinical information about the subject. Additionally or alternatively, one element may be an image of the subject, such as produced using various imaging technologies such as for example Ultrasonic Imaging, Magnetic Resonance Imaging (MRI), Tactile imaging, Echocardiograms, X-ray Computed Tomography (CT), or the like.

As an example, consider the following clinical question about breast cancer, which appeared in a Medical Licensing Examination. The question also includes an ultrasonic image of the breast of the subject. The question may read as follows: "a 52-years-old woman, with BMI of 29 kg/m². Examinations shows large dense breasts; a 2-cm, firm, mobile mass is palpated in the upper outer quadrant of the left breast. There are no changes in the skin or nipple, and there is no palpable axillary adenopathy. Which of the following is the most likely diagnosis?
(A) Fibroadenoma
(B) Fibrocystic changes of the breast
(C) Infiltrating ductal carcinoma
(D) Intraductal papiloma"

As can be appreciated, the question includes textual information describing clinical information about the subject (e.g., "a 52-years-old woman, with BMI . . . no palpable axillary adenopathy").

One element of the question may be the ultrasonic image of breast. Another element may be the textual information describing clinical information about the subject. The answer to the question may be the correct diagnosis, for example, the diagnosis appearing in choice (D).

In Step 220, values may be determined to the independent variables based on the clinical information. The various aspects disclosed in the clinical information may be associated to different variables, each may be independent of the other. As an example, in the above question, the independent variables of the clinical information may be an age variable with value of 52, a BMI variable with value 29, a symptoms variable with "mobile mass palpated in the upper outer quadrant of the left breast" value, a skin symptom variable may be "no change" value or "0" value representing no change, a nipple symptom variable may be "no change" value or "0" value representing no change, and a palpable axillary adenopathy variable may be "no" value or "0" value.

In some exemplary embodiments, a "not assigned" value may be determined to the independent variables. "not assigned" value may represent that the variable it is associated with is not disclosed in the clinical information.

In some exemplary embodiments, the possible values of the independent variables (e.g., a domain of the independent variable) which may be based on clinical information, may be defined manually by a professional or may be found automatically by searching medical literature for symptoms or other clinical information valid for the given question, and do not change the answer.

In Step 230, in case the question comprises an image, clinical features of the image may be extracted from the image. For example, if the question is a clinical question about breast cancer, an optional image may be ultrasonic breast image. Ultrasonic breast image may be represented by a combination of three clinical features: Breast Imaging-Reporting and Data System (BIRADS), Homogeneity and Echogenicity. BIRADS assessment categories may be integer values from 0 to 6:0 may mean Incomplete which may stand for low image quality, 1 may mean Negative i.e. no tumor detected, 2 may mean Benign finding(s), 3 may mean Probably benign, 4 may mean Suspicious abnormality, 5 may mean Highly suggestive of malignancy and 6 may mean Known biopsy—proven malignancy. Homogeneity feature may have two values: homogenous or heterogeneous tumor. Echogenicity feature assessment categories may be an-echoic, iso-echoic or hyper-echoic. Referring again to the example above, the image accompanying the question may be have the following clinical features BIRADS=3, Homogeneity=homogenous, and Echogenicity=iso-echoic. It will be understood, however, that the disclosed subject matter is not limited to these clinical features and other clinical features may be used instead or in addition thereto.

In Step 240, one or more variants of an element which do not change the answer, may be determined In some exemplary embodiments, a first variant of a first element of the question may be determined in addition to a second variant of a second element of the question. For each element, there may be more than a single potential variant.

In Step 242, variants may be determined by determining alternative values of the independent variables representing the clinical information.

In some exemplary embodiments, a variant of an element may define a value of one variable who had a value in the question to be "not assigned", as long as such a variant does not change the answer. Additionally or alternatively, the variant may define a value of a variable who was originally "not assigned" to have a value. In some exemplary embodiments, the variant may replace one assigned variable by another. Additionally or alternatively, the variant may comprise new variables associated with new elements that do not appear in the clinical information. In a case of a clinical question, the new elements may be new clinical information about the subject. Referring to the above-mentioned example, new textual information describing new clinical information about the subject may be determined as a new alternative element of the question, for example: "the women also suffers from febrile response". The new clinical information may be associated to a new independent variable. The new independent variable may be a fever variable. A value may be determined to the new independent variable, for example: "febrile response" or "unusually high" or the like. The new alternative element may be determined as a variant that does not change the answer, and may replace an element of the question or a portion of an element (e.g., portion of the clinical information).

In Step 244, a variant of an original image may be determined. The image variant may be an alternative image characterized by the clinical features of the original image. Referring again to the above-mentioned example, the variant may be another image that is characterized with the following clinical features: BIRADS=3, Homogeneity=homogenous, and Echogenicity=iso-echoic. In some exemplary embodiments, the alternative images may be obtained from a database. Additionally or alternatively, the alternative images may be images that accompanied other questions, such as questions retained in a Questions Database, such as 120 of FIG. 1. Additionally or alternatively, the alternative images may be images that were not previously associated with any other question.

In some exemplary embodiments, instead of using deterministic substitutions both for clinical information and for images, it may be useful to utilize probabilistic function for feature substitutions. A probabilistic function may be used to simulate possible errors in various system components, such as in an NLP component analyzing the clinical information, an image feature extractor extracting a clinical feature from an image, or the like. As an example we refer, again, to the example above. Instead of creating only new questions in which the images are characterized with BIRADS=3, the disclosed subject matter may generate 80% of the questions with BIRADS=3, 9% of the cases with BIRADS=2, 9% of the cases with BIRADS=4 and 1% of the cases with BIRADS=5 and 1% of the cases with BIRADS=1. Other distributions may also be used. By simulating errors in other components of the system, testing of the system may simulate testing of actual operation of the system, in which the analysis of the question being answered may be incorrect or not accurate. The distribution used may be an expected inaccuracy distribution. For example, it may be expected that in 9% of the cases, an image with BIRADS=3 may erroneously be marked as BIRADS=4. Usage of probabilistic function may also be useful for training the system.

In some exemplary embodiments, in order to determine a variant, the disclosed subject matter may utilize a database indicating equivalent values of variables (e.g., different values of the same variable and/or values of different variables). The equivalency of the variables may be with respect to their implication on the answer such that all equivalent values do not change the answer. The database may be defined manually by professionals and researchers. Additionally or alternatively, the database may be automatically gleaned from medical papers and similar resources.

In Step 250, new questions comprising the variant may be generated. Referring to the example above, a new question with a variant of BMI variable with value 25 kg/m² instead of 29 kg/m² may be generated. The other variables may contain the same values as in the existing question. In some exemplary embodiments, the generated question may include clinical information in a textual format that is generated using a template to convert the value of each variable to text. Another new question may be generated, comprising a variant of skin symptom variable with "redness in skin" value instead of "no change".

In some exemplary embodiments, such a new question may comprise variants of new variables associated with new elements that do not appear in the clinical information and do not change the answer. In a case of a clinical question, the new elements may be new clinical information about the subject. Referring to the above-mentioned example, a new question with new textual information describing new clinical information about the subject may be generated, for example: adding "the women also suffers from febrile response" to the clinical information, and removing "there is no palpable axillary adenopathy".

In Step 260, the new question may be provided to a system. In some exemplary embodiments, in Step 262, the new question may be used to test the system. Additionally or alternatively, in case the system implements machine learning, the new question and the answer may be used to train the system (Step 264).

Figure 3:
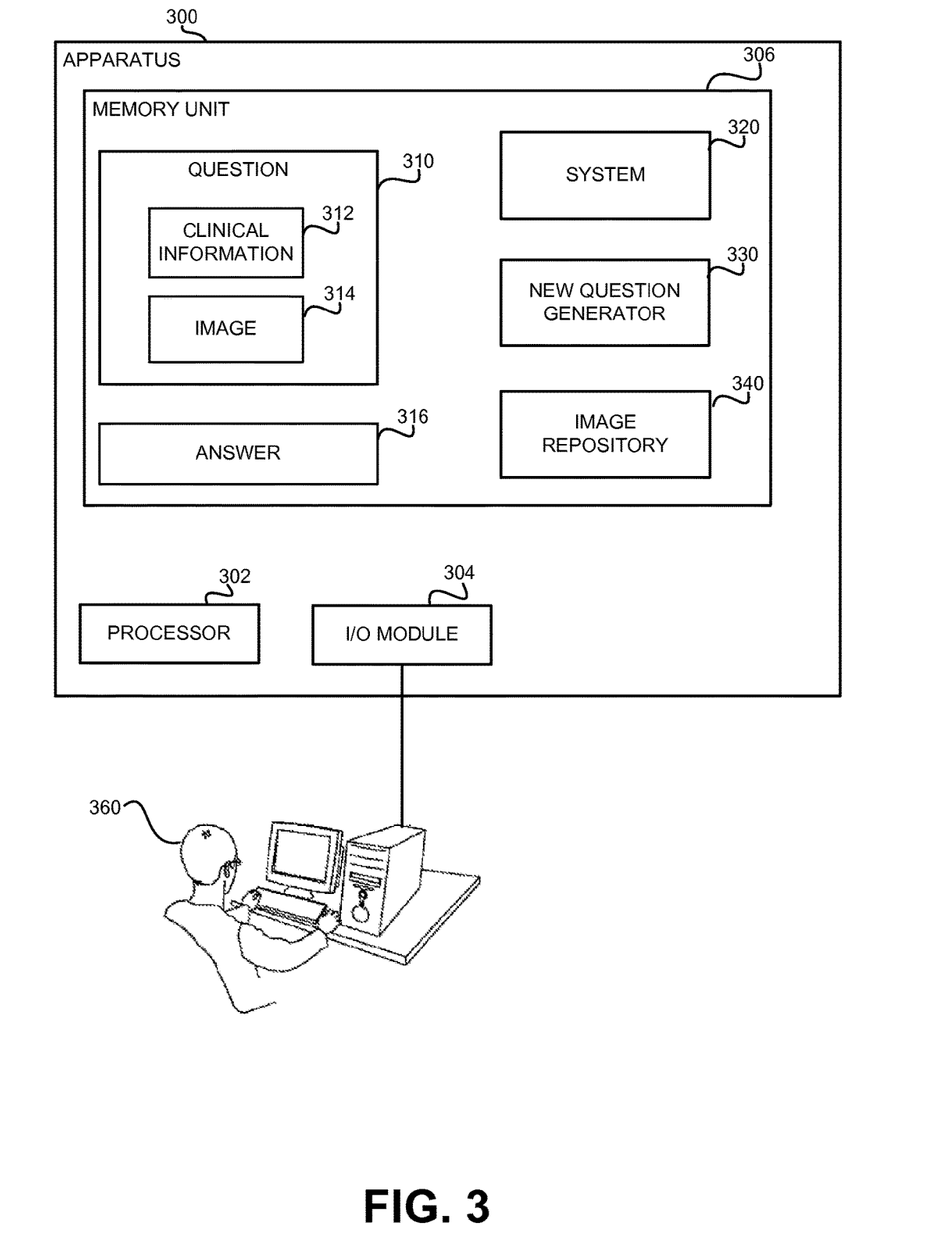
FIG. 3 shows a block diagram of an apparatus, in accordance with some exemplary embodiments of the disclosed subject matter.

Referring now to FIG. 3 showing an apparatus, in accordance with some exemplary embodiments of the disclosed subject matter. An Apparatus 300 may be configured to generate new questions, in accordance with the disclosed subject matter. Additionally or alternatively, Apparatus 300 may be configured to perform the method depicted in FIG. 2.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 304. I/O Module 304 may be utilized to provide an output to and receive input from a User 360. The I/O Module 304 may be used to obtain a Question 310 from a question database, such as 120 of FIG. 1. In some exemplary embodiments, User 360 may obtain Question 310 from examinations administrated to human participant, such as 110 of FIG. 1, and manually provide Question 310 to Apparatus 300. In some exemplary embodiments, User 360 may provide images to be used as variant and potentially stored in Image Repository 340. User 360 may be manually define clinical features of each or some of the images in Image Repository 340 and/or images comprised by questions, such as Question 310. Additionally or alternatively, User 360 may manually set a value to independent variables based on the clinical information. In some exemplary embodiments, User 360 may define an inaccuracy distribution to be used when generation new questions. It will be noted that User 360 may or may not be an expert in the field of the questions.

In some exemplary embodiments, Apparatus 300 may comprise a Memory Unit 306. Memory Unit 306 may be a hard disk drive, a Flash disk, a Random Access Memory (RAM), a memory chip, or the like. In some exemplary embodiments, Memory Unit 306 may retain program code operative to cause Processor 302 to perform acts associated with any of the subcomponents of Apparatus 300.

In some exemplary embodiments, Memory Unit 306 may retain an Image Repository 340, which may store images to be used by Apparatus. Image Repository 340 may, for example, retain all the images of the questions in the corpus such as Image 316. Additionally or alternatively, Image Repository 340 may comprise additional images not associated with any question. In some exemplary embodiments, Image Repository 340 may be external to Apparatus 300, such as retained in a remote data storage, a computerized server, or the like. Additionally or alternatively, Image Repository 340 may be a part of questions database, such as 120 of FIG. 1.

In some exemplary embodiments, Memory Unit 306 may retain questions to be used for generation of new questions, such as Question 310. Question 310 may comprise one or more elements that define Answer 316. One element may be an Image 314. Another element may be Clinical Information 312. Apparatus 300 may comprise a New Question Generator 330, which may be configured to generate new questions based on Question 310 and Answer 316. The generation may comprise a determination of a variant of an element of Question 310 (e.g., Clinical Information 312, Image 314, or the like). The generated new question may comprise the variant and may be considered to have Answer 316 as the answer thereto.

In some exemplary embodiments, a variant of Image 314 may be obtained from Image Repository 340 that may contain images from different questions.

Apparatus 300 may further comprise a System 320, which may be configured to automatically solve questions similar to the new questions that New Question Generator 330 generates. In some exemplary embodiments, System 320 may be a decision support system. Additionally or alternatively, System 320 may implement machine learning. In some exemplary embodiments, System 320 may be external to Apparatus 300.

Apparatus 300 may utilize the new question and Answer 316 to test System 320. Additionally or alternatively, Apparatus 300 may train System 320, using the new question and Answer 316.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational Steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, Steps, operations, elements, and/or components, but do not preclude the presence or addition of one or more other features, integers, Steps, operations, elements, components, and/or groups thereof.

The corresponding structures, materials, acts, and equivalents of all means or Step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   obtaining a question from a corpus of questions, wherein the question comprises one or more elements that define an answer for the question, wherein the question is a question about a subject, wherein the one or more elements comprising an image of the subject, wherein said obtaining comprises retrieving the image from an image respository;
   obtaining the answer;
   automatically generating, by a processor, a multiplicity of new questions based on the question and the answer, wherein said automatically generating comprises:
      determining a multiplicity of variants of the one or more elements, wherein each of the new questions comprises one of the multiplicity of variants, wherein each of the multiplicity of variants does not change the answer, wherein the answer for the question is an answer for each of the new questions, wherein said determining comprises utilizing a probabilistic function to simulate errors in a component of a system configured to retrieve the one or more elements, wherein the probabilistic function is based on an expected inaccuracy distribution of the component;
   wherein said obtaining the question, said obtaining the answer and said automatically generating are performed a plurality of times with respect to a plurality of questions from the corpus of questions, whereby increasing the corpus of questions by an order of magnitude; and
   training the system using the increased corpus of questions, wherein said training comprises providing the system new questions and corresponding answers thereto for training the system, wherein the new questions comprises a sample of questions for which the answer may be incorrect, wherein the sample of questions comprise a distribution of the one or more elements that is consistent with the expected inaccuracy distribution of the component, whereby the system is trained to provide the answer when the component provides inaccurate value for the one or more elements, wherein the system implements machine learning; and
   in response to the system receiving a second question automatically providing a predicted answer to the second question based on said training, wherein the second question comprises a value of the one or more elements, wherein the value of the one or more elements is obtained by the component of the system.

2. The computer-implemented method of claim 1, wherein the system is a decision support system.

3. The computer-implemented method of claim 1 further comprises testing the system using the multiplicity of new questions, wherein said testing comprises using the system to provide a proposed answer to the each of the new questions and comparing the proposed answer with the answer.

4. The computer-implemented method of claim 1, wherein the question is a clinical question about the subject.

5. The computer-implemented method of claim 4, wherein the one or more elements comprising a clinical information about the subject.

6. The computer-implemented method of claim 5,
   wherein the one or more elements of the question comprise a value to one or more independent variables;
   wherein said determining the multiplicity of variants of the one or more elements comprises determining a multiplicity of alternative values of the one or more independent variables, whereby each of the new questions relates to a different subject, that is different than the subject.

7. The computer-implemented method of claim 4 further comprises extracting from the image one or more clinical features;
   wherein said determining the variant of the image comprises obtaining a second image, wherein the second image is characterized by the one or more clinical features.

8. The computer-implemented method of claim 4, wherein the answer is a clinical diagnosis of the subject.

9. The computer-implemented method of claim 1, wherein the question is a question from an examination administered to people.

10. The method of claim 1, wherein the probabilistic function configured to utilize an expected inaccuracy distribution of the components of the system.

11. A computerized apparatus having a processor, the processor being adapted to perform the steps of:
    obtaining a question from a corpus of questions, wherein the question comprises one or more elements that define an answer for the question, wherein the question is a question about a subject, wherein the one or more elements comprising an image of the subject wherein said obtaining comprises retrieving the image from an image repository;
    obtaining the answer;
    automatically generating a multiplicity of new questions based on the question and the answer, wherein said automatically generating comprises:
       determining a multiplicity of variants of the one or more elements, wherein each of the multiplicity of variants does not change the answer, wherein each of the new questions comprises one of the multiplicity of variants, wherein the answer for the question is an answer for each of the new questions, wherein said determining comprises utilizing a probabilistic function to simulate errors in a component of a system configured to retrieve the one or more elements, wherein the probabilistic function is based on an expected inaccuracy distribution of the component;
    wherein said obtaining the question, said obtaining the answer and said automatically generating are performed a plurality of times with respect to a plurality of questions from the corpus of questions, whereby increasing the corpus of questions by an order of magnitude;
    training the system using the increased corpus of questions, wherein said training comprises providing the system new questions and corresponding answers thereto for training the system, wherein the new question comprises a sample of questions for which the answer may be incorrect wherein the sample of questions comprise a distribution of the one or more elements that is consistent with the expected inaccuracy distribution of the component, whereby the system is trained to provide the answer when the component provides inaccurate value for the one or more elements, wherein the system implements machine learning; and
    wherein the system is configured to receive a second question and in response to receiving the second question automatically provide a predicted answer thereto based on said training, wherein the second question comprises a value of the one or more elements, wherein the value of the one or more elements is obtained by the component of the system.

12. The computerized system of claim 11, wherein the processor is further adapted to test the system using the multiplicity of new questions, wherein the processor tests the system by using the system to provide a proposed answer to each of the new questions and comparing the proposed answer with the answer.

13. The computerized apparatus of claim 11, wherein the question is a clinical question about a subject, wherein the one or more elements comprising a clinical information about the subject.

14. The computerized apparatus of claim 13, wherein the processor is further adapted to perform:
    determining a value to one or more independent variables based on the clinical information,
    wherein said determining the multiplicity of variants of the clinical information comprises determining a multiplicity of alternative values of the one or more independent variables.

15. The computerized apparatus of claim 13, wherein the processor is further adapted to perform: extracting from the image one or more clinical features;
    wherein said determining the multiplicity of variants of the image comprises obtaining a second image, wherein the second image is characterized by the one or more clinical features.

16. The computerized apparatus of claim 11, wherein the question is a question from an examination administered to people.

17. The computerized apparatus of claim 11, wherein the probabilistic function configured to utilize an expected inaccuracy distribution of the components of the system.

18. A computer program product comprising a computer readable storage medium retaining program instructions, which program instructions when read by a processor, cause the processor to perform a method comprising:
    obtaining a question from a corpus of questions, wherein the question comprises one or more elements that define an answer for the question, wherein the question is a question about a subject, wherein the one or more elements comprising an image of the subject, wherein said obtaining comprises retrieving the image from an image repository;
    obtaining the answer;
    automatically generating a multiplicity of new questions based on the question and the answer, wherein said automatically generating comprises:
       determining a multiplicity of variants of the one or more elements, wherein each of the new questions comprises one of the multiplicity of variants, wherein each of the multiplicity of variants does not change the answer, wherein the answer for the question is an answer for each of the new questions, wherein said determining comprises utilizing a probabilistic function to simulate errors in a component of a system configured to retrieve the one or more elements, wherein the probabilistic function is based on an expected inaccuracy distribution of the component;
    wherein said obtaining the question, said obtaining the answer and said automatically generating are performed a plurality of times with respect to a plurality of questions from the corpus of questions, whereby increasing the corpus of questions by an order of magnitude;

training the system using the increased corpus of questions, wherein said training comprises providing the system new questions and corresponding answers thereto for training the system, wherein the new question comprises a sample of questions for which the answer may be incorrect, wherein the sample of questions comprise a distribution of the one or more elements that is consistent with the expected inaccuracy distribution of the component, whereby the system is trained to provide the answer when the component provides inaccurate value for the one or more elements, wherein the system implements machine learning: and in response to the system receiving a second question, automatically providing a predicted answer to the second question based on said training wherein the second question comprises a value of the one or more elements, wherein the value of the one or more elements is obtained by the component of the system.

19. The computer program product of claim 18, wherein the probabilistic function configured to utilize an expected inaccuracy distribution of the components of the system.

* * * * *